United States Patent [19]

Nock

[11] Patent Number: 4,502,810
[45] Date of Patent: Mar. 5, 1985

[54] DEVICE FOR PERPENDICULARLY JOINING FURNITURE PANELS

[75] Inventor: Hans Nock, Rohrdorf, Fed. Rep. of Germany

[73] Assignee: Hafele KG, Fed. Rep. of Germany

[21] Appl. No.: 532,376

[22] Filed: Sep. 15, 1983

[30] Foreign Application Priority Data

Sep. 30, 1982 [DE] Fed. Rep. of Germany ....... 3236169

[51] Int. Cl.³ .............................................. F16B 9/02
[52] U.S. Cl. .................................... 403/231; 403/407
[58] Field of Search .............. 403/231, 407, 406, 230, 403/189

[56] References Cited

U.S. PATENT DOCUMENTS 2,114,508 4/1938 Steiner ................................ 403/407

FOREIGN PATENT DOCUMENTS 932765 12/1947 France ................. 403/401
2415738 9/1979 France ................. 403/407
857075 12/1960 United Kingdom ................. 403/407
2039339 8/1980 United Kingdom ................. 403/231

Primary Examiner—Andrew V. Kundrat
Attorney, Agent, or Firm—Thomas W. Speckman

[57] ABSTRACT

A device for perpendicularly joining furniture panels, the device having a cylindrical housing inserted into a blind bore provided in a first furniture panel and a mounting angle secured to a second furniture panel and adapted to be inserted into a receptacle provided in the housing and extending parallel to the axis of the housing. The mounting angle has lateral protrusions for engagement with a screw threaded tightening pin adjustable in a threaded hole in the housing, the threaded hole for the tightening pin forms an acute angle with the receptacle for the mounting angle and is accessible from the same side as the receptacle. By constructing the mounting angle in the form of an L-shaped or Z-shaped angle having lateral protrustions providing engagement with screw threaded tightening pins, substantially greater tightening forces for a corner joint are produced.

20 Claims, 7 Drawing Figures

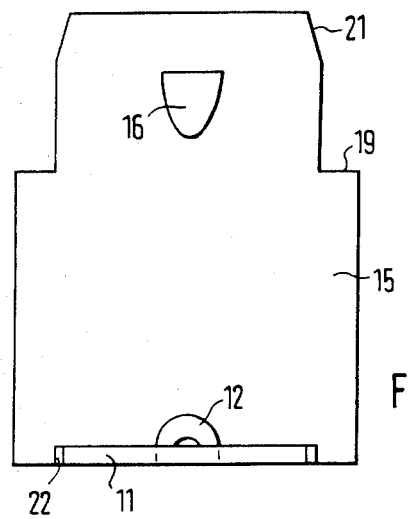
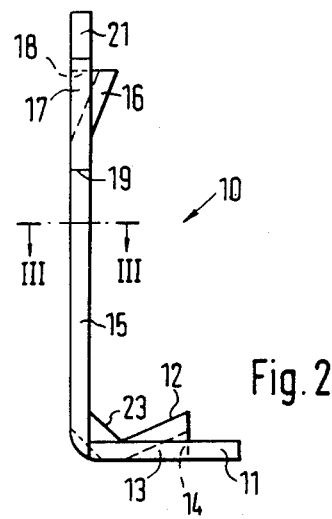
Fig.1　Fig.2
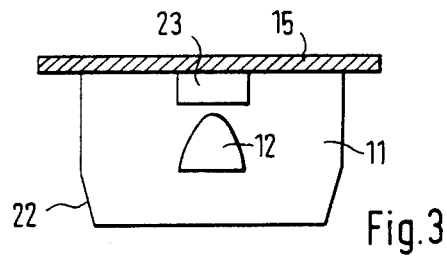
Fig.3
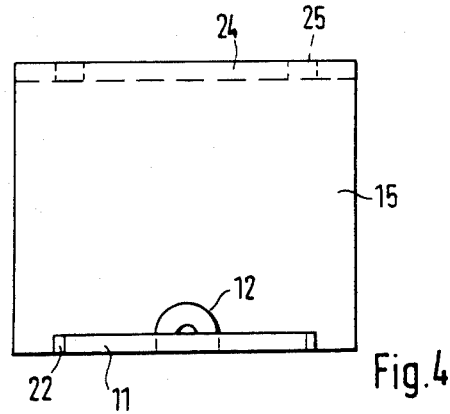
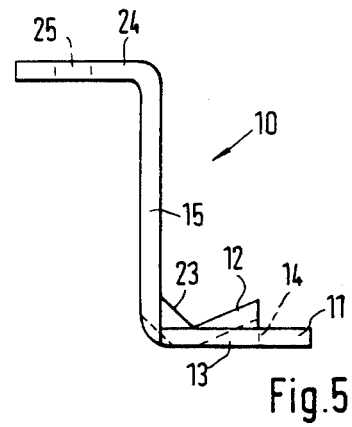
Fig.4　Fig.5

U.S. Patent   Mar. 5, 1985   Sheet 2 of 2   4,502,810
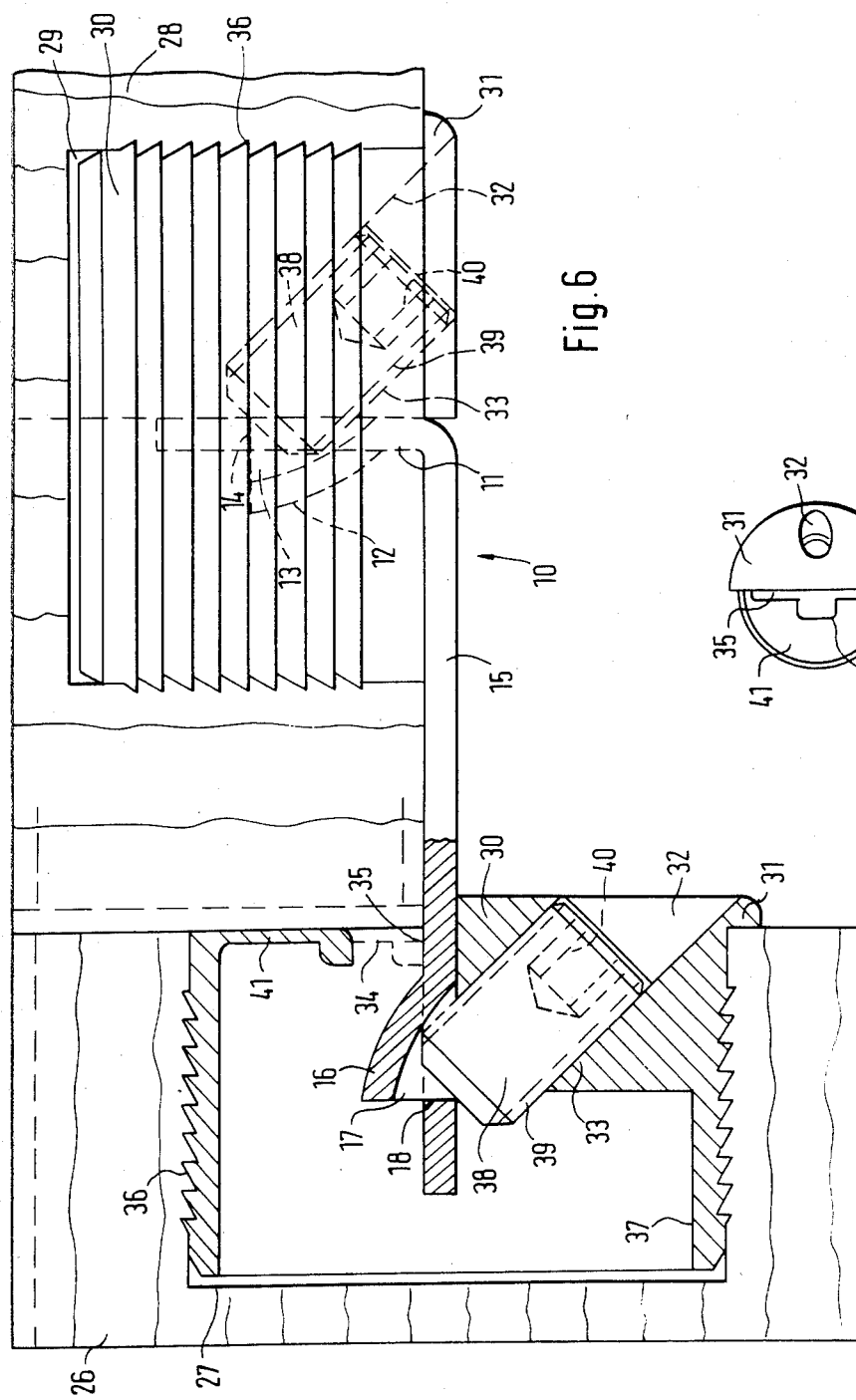

DEVICE FOR PERPENDICULARLY JOINING FURNITURE PANELS

BACKGROUND OF THE INVENTION

1. Field of the Invention

This invention relates to a device for joining furniture panels in a position perpendicular to each other. The device comprises in combination a cylindrical housing inserted into a blind bore provided in a first furniture panel and an angular bracket secured on a second furniture panel and adapted to be inserted into a receptacle provided in the housing and extending parallel to the center axis of the housing. The angular bracket has lateral offsets for engagement with a screw threaded tightening pin adjustable in a threaded hole in the housing, whereby the threaded hole for the tightening pin forms an acute angle with the receptacle for the angular bracket provided in the housing and is accessible from the same side as the receptacle.

2. Description of the Prior Art

A device of this general type is disclosed in German utility model No. GM 18 86 649. In this prior device, the fitting on the second furniture panel is in the form of a tightening pin mounted in a blind bore in the second furniture panel and projecting from the front face of the second furniture panel. In this familiar device, a weak point is locking of the tightening pin in the second furniture panel which detracts from the strength of the tightening forces between the two furniture panels. Moreover, this prior device can be used only for joints where the furniture panels are movable with respect to each other, in the direction of insertion of the tightening pin into the receptacle provided in the housing, by at least the distance that is determined by the portion of the tightening pin which projects from the second furniture panel. These disadvantages of the prior device render it unsuitable for use as a fitting for a bedstead because in that case substantially greater tightening forces are required and the necessary mutual adjustability of the furniture panels, namely, the two side boards and the head board and foot board, is not possible at all corners.

SUMMARY OF THE INVENTION

It is an object of the present invention to provide a device of the first mentioned type by which substantially greater tightening forces can be produced between the furniture panels to be joined together, without requiring excessive fitting motions of the furniture panels as they are being joined successively one to the other.

This is accomplished according to the invention by the novel features of the design and combination of component parts as described hereinbelow.

A mounting part in the form of an angular bracket is capable of being inserted, secured and tightened when the two furniture panels are in a position perpendicular to each other. In doing so, the insertable portion of one leg of the angular bracket is always inserted into the receptacle of a housing mounted in the blind bore provided in the first furniture panel and is drawn tight by a screw threaded pin. If the mounting angle is Z-shaped, the other leg may be screwed directly to the second furniture panel, and in the case of an L-shaped angle, the other leg may be inserted into the receptacle of another housing provided in a blind bore in the second furniture panel and tightened by a screw threaded pin associated with that housing. Since the housings take up a larger area of the furniture panels than the tightening pins of the prior device, substantially greater tensioning forces are produced, without causing the housings to loosen or fall out of the blind bores in the furniture panels. The L-shaped or Z-shaped angle according to the invention is always mounted in a corner formed by any two furniture panels and serves simultaneously as an additional reinforcement for the corner joint as the screw threaded pin or pins, respectively, are tightened.

According to a particularly advantageous embodiment, the housing is in the form of a cup turned upside down, with the bottom being flush with the first or second furniture panel, respectively, and is provided with a slot-shaped aperture serving as a receptacle for the mounting angle. The interiorly threaded hole for the exteriorly threaded tightening pin is located in an area of increased thickness of the inverted cup bottom adjacent the aperture. This embodiment of the housing has the advantage that it is capable of concealing the blind bore in the visible area except for the necessary aperture and that it can readily be made with simple tools such as by plastic injection molding.

In order for the insertable part of the mounting angle leg to be drawn into the receiving slot in the housing as the tightening pin is screwed in, it is necessary to provide an operative connection between the protrusions on the insertable mounting angle leg and the screw threaded tightening pin. This is achieved in a simple manner in that the open end of the protrusion on the insertable mounting angle leg forms the edge of an aperture in the leg. The protrusions are produced by stamping or molding portions of the legs of the mounting angle to form a recepacle for the screw threaded tightening pin. In this receptacle, the end of the tightening pin is guided toward the edge of the aperture.

To facilitate the insertion of the thus constructed insertable part of the mounting angle leg into the housing, the slot-shaped receptacles in the housings include an enlarged section to accommodate the stamped or punched out and molded protrusions of the mounting angle leg.

A limit to the tightening movement of an L-shaped mounting angle is achieved by making one leg of the mounting angle narrower than the other whereby the narrower leg constitutes the insertable part and the other leg constitutes the terminal stop for the insertable part. Furthermore, one leg of the mounting angle is shorter than the other leg, and the insertable portion of the other leg is narrower than the leg itself, with the protrusions or shoulders at the transitional section acting as terminal stops for the tightening movement.

A flush mounting between the housing and the mounting angle is achieved according to one embodiment in that the receiving slot is diametrically disposed and a thicker portion of the housing bottom is adjacent the receiving slot and has the threaded bore for the tightening pin therein, the thicker portion projects from the wall of the inverted cup-shaped housing and is formed to serve as an overlapping rim for the housing. The overlapping rim has a thickness which corresponds to the thickness of the mounting angle.

The fastening of the housings in the blind bores of the furniture panels is further enhanced by counterdirectional catch means disposed along the periphery of the housing.

BRIEF DESCRIPTION OF THE DRAWING

The invention will be described in further detail with reference to specific embodiments illustrated in the drawings, in which:

FIG. 1 is a front view of an L-shaped mounting angle forming a composite part of a device according to the invention;

FIG. 2 is a side view of the mounting angle of FIG. 1;

FIG. 3 is a sectional view of the mounting angle of FIG. 2, taken along the line III—III;

FIG. 4 is a front view of a Z-shaped mounting angle of a device of the invention;

FIG. 5 is a side view of the mounting angle of FIG. 4;

FIG. 6 is an enlarged sectional view of a device of the invention including the mounting angle of FIG. 1; and FIG. 7 is a top plan view of a housing of a device according to the invention.

DESCRIPTION OF THE PREFERRED EMBODIMENTS

The device of the invention utilizes a mounting in the form of angle 10. The short leg 11 of mounting angle 10 forms the insertable portion of the mounting angle and at its end has sloping edges 22 to fit into a slot-shaped receptacle 35 provided in housing 30 as shown in FIG. 7. Stamped or punched out or molded from leg 11 is protrusion 12 to form receptacle 13 affording access to the edge of the aperture in leg 11 which edge acts as stop 14. The corner region of mounting angle 10 is reinforced by rub block 23. The free end of longer leg 15 for mounting angle 10 forms an insertable portion which is narrower. The protrusions or shoulders form terminal stops 19 for limiting the insertion movement of the insertable part of leg 15. Protrusion 16 again is stamped or punched out or molded to form receptacle 17 affording access to the edge of the aperture acting as stop 18. The end section of the insertable part of leg 15 again is bevelled at 21 to facilitate insertion into housing 30.

As is illustrated in the sectional view of FIG. 5, mounting angle 10 of FIGS. 1 to 3 is used to join together two perpendicularly disposed furniture panels 26 and 28. In the illustrated embodiment, furniture panel 28 is placed with its front face adjacent the top surface of furniture panel 26. Each of the furniture panels 26 and 28 is provided with a blind bore 27 and 29, respectively, into which cup-shaped housing 30 is inserted. The retention of housing 30 in the blind hole is enhanced by peripherally extending catches 36. Housing 30 is open at the top and closed at the bottom by its inverted bottom part 41, leaving only receiving slot 35 exposed. As shown in FIG. 7, slot 35 extends approximately diametrically and is provided in its midsection with enlarged portion 34 in order to receive portions 12 and 16 of insertable leg portions of mounting angle 10. Adjacent receiving slot 35, housing bottom 41 is substantially thicker over half of its area and is provided with interiorly threaded hole 33 to receive exteriorly threaded tightening pin 38. Entrance section 32 of threaded hole 33 may be smooth, that is, without threads. The axis of threaded hole 33 extends at an acute angle to the direction of insertion into receiving slot 35. Housing bottom 41 of increased thickness projects from the wall of inverted cup-shaped housing 30 and forms an overlapping rim 31, preferably having a thickness corresponding to the thickness of mounting angle 10.

As is shown in FIGS. 6 and 7, short leg 11 of mounting angle 10 is inserted into receiving slot 35 of housing 30 which is mounted in blind bore 29 provided in first furniture panel 28. Tightening pin 38 with its exterior screw thread 39 is adjusted in threaded hole 33 in housing 30 until its end engages the edge of the aperture in leg 11 which serves as stop 14. As pin 38 is further screwed into hole 33, leg 11 is drawn into receiving slot 35 and is locked in place. Wider leg 15 of mounting angle 10 acts to limit the tightening motion by abutting against bottom 41 of housing 30.

The insertable part of leg 15 is inserted into receiving slot 35 of housing 30 which is mounted in blind hole 27 of second furniture panel 26. The screw threaded tightening pin 38 of housing 30 comes into engagement with the edge of the aperture acting as stop 18 to enable the insertable part of leg 15 to be drawn into receiving slot 35 of housing 30. To limit this inbound drawing motion, protrusions or shoulders 19 on leg 15 serve to act as terminal stops as they abut bottom 41 of housing 30. Leg 15 of mounting angle 10 is flush with overlapping edge 31 of housing 30 in blind hole 29 of furniture panel 28.

In the case where no housing is mounted in second furniture panel 26, Z-shaped mounting angle 10 of FIGS. 4 and 5 may be used to advantage. The insertable portion of leg 11 is tightened in furniture panel 28 in the same manner as described in the foregoing. The other leg 24 of the Z-shaped mounting angle is adapted to be screwed directly to second furnature panel 26 for which purpose leg 24 is provided with screw holes 25.

I claim:

1. Device for perpendicularly joining furniture panels, said device comprising in combination a cylindrical housing having a receptacle receiving slot inserted into a blind bore provided in a first furniture panel and mounting means secured on a second furniture panel and adapted to be inserted into said receptacle receiving slot provided in said inserted housing and extending parallel to the center axis of said housing, said mounting means having lateral offsets for engagement with a screw threaded tightening pin adjustable in a threaded hole in said housing, said threaded hole forming an acute angle with said receptacle receiving slot for said mounting means and being accessible from the same side as said receptacle receiving slot, characterized in that said mounting means comprises an angular bracket (10) having a short leg (11) with protrusion (12) extending from one side thereof and forming the edge of an aperture, said leg (11) adapted to be inserted into said receptacle receiving slot (35) in said housing (30), said mounting means tightened by said screw threaded tightening pin (38) within said housing and said angular bracket having a long leg (15) secured to said second furniture panel.

2. The device of claim 1 wherein said mounting means is a Z-shaped angular bracket said long leg (15) joining said short leg (11) and a third leg (24) having through holes (25) for screw attachment to said second furniture panel.

3. The device of claim 1 wherein said housing (30) is in the form of an inverted cup with a bottom (41) flush with the top surface of said furniture panel and having an interiorly threaded hole (33) for receiving exteriorly threaded tightening pin (38) located in an area of increased thickness of said bottom (41) adjacent said slot (35) therein.

4. The device of claim 1, wherein said protrusion (12) of said leg (11) forms an additional receptacle (13) for said screw threaded tightening pin (38).

5. The device of claim 4 wherein said receiving slot (35) in said housing (30) has an enlarged section (34) to accommodate said protrusion (12).

6. The device of claim 1 wherein said short leg (11) is narrower than said long leg (15) and said narrower leg (11) constitutes the insertable part and said long leg (15) constitutes the terminal stop for said insertable part.

7. The device of claim 2 wherein said short leg (11) is narrower than said long leg (15) and said narrower leg (11) constitutes the insertable part and said long leg (15) constitutes the terminal stop for said insertable part.

8. The device of claim 1 wherein the end insertable portion of said long leg (15) is narrower than the leg (15) itself and has shoulder portions (19) at the transitional section acting as terminal stops for the tightening movement.

9. The device of claim 1 wherein said receiving slot (35) is diametrically disposed, a thicker portion of housing bottom (41) is adjacent said receiving slot (35) and has threaded bore (33) for said tightening pin (38) therein projects from the wall of said housing (30) and serves as an overlapping rim (31) for said housing (30), and said overlapping rim (31) has a thickness which corresponds to the thickness of said angular bracket (10).

10. The device of claim 2 wherein said receiving slot (35) is diametrically disposed, a thicker portion of housing bottom (41) is adjacent said receiving slot (35) and has threaded bore (33) for said tightening pin (38) therein projects from the wall of said housing (30) and serves as an overlapping rim (31) for said housing (30), and said overlapping rim (31) has a thickness which corresponds to the thickness of said angular bracket (10).

11. The device of claim 1 wherein the exterior of said housing (30) comprises counterdirectional catches (36).

12. Device for perpendicularly joining furniture panels, said device comprising in combination a cylindrical housing inserted into a blind bore provided in a first furniture panel and a mounting means secured on a second furniture panel and adapted to be inserted into a receptacle receiving slot provided in said housing and extending parallel to the center axis of said housing, said mounting means having lateral offsets for engagement with a screw threaded tightening pin adjustable in a threaded hole in said housing, said threaded hole forming an acute angle with said receptacle receiving slot and being accessible from the same side, wherein said mounting means comprises an L-shaped angular bracket (10) having a short leg (11) with protrusion (12) extending from one side thereof adapted to be inserted into said receptacle receiving slot (35) in said housing (30), said mounting means tightened by said screw threaded tightening pin (38) within said housing, and a longer leg (15) with protrusion (16) extending from one side thereof adapted to be inserted into a receptacle receiving slot (35) in a second housing (30) inserted into a blind bore in said second furniture panel, said mounting means tightened by a screw threaded tightening pin (38) within said second housing.

13. The device of claim 12 wherein said protrusion (12) of said leg (11) forms an additional receptacle (13) for said screw threaded tightening pin (38).

14. The device of claim 13 wherein said receiving slot (35) in said housing (30) has an enlarged section (34) to accommodate said protrusion (12).

15. The device of claim 12 wherein said protrusion (12) on the insertable portion of said short leg (11) forms the edge of an aperture in said leg (11).

16. The device of claim 12 wherein said short leg (11) is narrower than said long leg (15) and said narrower leg (11) constitutes the insertable part and said long leg (15) constitutes the terminal stop for said insertable part.

17. The device of claim 12 wherein the end insertable portion of said long leg (15) is narrower than the leg (15) itself and has shoulder portions (19) at the transitional section acting as terminal stops for the tightening movement.

18. The device of claim 12 wherein said receiving slot (35) is diametrically disposed, a thicker portion of housing bottom (41) is adjacent said receiving slot (35) and has threaded bore (33) for said tightening pin (38) therein projects from the wall of said housing (30) and serves as an overlapping rim (31) for said housing (30), and said overlapping rim (31) has a thickness which corresponds to the thickness of said angular bracket (10).

19. The device of claim 12 wherein the exterior of said housing (30) comprises counterdirectional catches (36).

20. The device of claim 12 wherein both said housings (30) are in the form of an inverted cup, with a bottom (41) flush with the top surface of said furniture panel and having an interiorly threaded hole (33) for receiving exteriorly threaded tightening pin (38) located in an area of increased thickness of said bottom (41) adjacent said slot (35) therein.

* * * * *